(12) United States Patent
Maeda

(10) Patent No.: US 7,394,741 B2
(45) Date of Patent: Jul. 1, 2008

(54) OPTICAL DISC READING AND REPRODUCING APPARATUS

(75) Inventor: Tomohisa Maeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 603 days.

(21) Appl. No.: 11/140,947

(22) Filed: Jun. 1, 2005

(65) Prior Publication Data

US 2005/0270917 A1 Dec. 8, 2005

(30) Foreign Application Priority Data

Jun. 2, 2004 (JP) ............................ P2004-164034

(51) Int. Cl.
*G11B 7/00* (2006.01)
(52) U.S. Cl. .................. 369/53.23; 369/44.25
(58) Field of Classification Search .............. 369/44.25, 369/44.26, 44.29, 53.28, 53.23, 47.4, 47.44, 369/44.32, 53.19
See application file for complete search history.

(56) References Cited

U.S. PATENT DOCUMENTS 6,295,256 B1 * 9/2001 Kimikawa et al. ....... 369/44.32

FOREIGN PATENT DOCUMENTS

| JP | 04-345924 | 12/1992 |
| JP | 09-128767 | 5/1997 |
| JP | 2002-100056 | 4/2002 |
| JP | 2002-312959 | 10/2002 |
| JP | 2003-296952 | 10/2003 |
| JP | 2005-235253 | 9/2005 |

* cited by examiner

*Primary Examiner*—Nabil Z Hindi
(74) *Attorney, Agent, or Firm*—Morgan, Lewis & Bockius LLP

(57) ABSTRACT

An optical disc reading and reproducing apparatus includes reading means for reading data recorded on an optical disc by applying laser light through an objective lens and detecting its reflected light, focus control means for performing focus control for moving the objective lens based on a focus error signal indicating an amount of deviation of a focusing position, focus bias adjustment means for adjusting a focus bias used in the focus control to a voltage in which amplitude of an acquired RF signal is maximized, and detection means for detecting that the amplitude becomes smaller than a predetermined threshold level. The focus bias adjustment means samples the RF signal and acquires the amplitude, sets the focus bias to the amount in which the amplitude of the RF signal is maximized, and stops sampling of the RF signal when the amplitude is detected to be smaller than the predetermined threshold level.

5 Claims, 4 Drawing Sheets

US 7,394,741 B2

OPTICAL DISC READING AND REPRODUCING APPARATUS

BACKGROUND OF THE INVENTION

1. Field of the Invention

This invention relates to an optical disc apparatus for reading and reproducing data recorded on an optical disc such as a CD or a DVD.

2. Description of the Related Art

Conventionally, in an optical disc apparatus for reading data recorded on an optical disc such as a CD or a DVD, focus control for matching a focusing position of applied laser light with a record surface of the optical disc has been performed. This focus control is control in which an objective lens arranged between the optical disc and an LD which is a light source is moved in a direction of approaching to and receding from the optical disc. The LD, the objective lens, an actuator for moving this objective lens in the direction of approaching to and receding from the optical disc, etc. are disposed in a pickup head. A signal inputted to the actuator in the focus control is a signal in which a focus servo signal generated based on a focus error signal (hereinafter called FE signal) indicating the amount of deviation of the record surface of the optical disc from the focusing position of the applied laser light is superimposed on a focus bias as is publicly known.

This focus bias is adjusted to a voltage in which amplitude of an RF signal which is a reading signal of data recorded on the optical disc is maximized. In other words, the optical disc apparatus is provided with a configuration for adjusting the focus bias so as to maximize the amplitude of the RF signal. This focus bias adjustment includes, for example, a method for stepwise changing a focus bias and sampling an RF signal and adjusting the focus bias to a voltage in which amplitude of the RF signal is maximized (see JP-A-2002-312959). Also, a method for adjusting a focus bias so as to minimize the amount of jitter of an RF signal (see JP-A-2002-100056) has been proposed.

Also, in JP-A-2002-100056, the method in which at the time of adjusting a focus bias, for a period during which jitter extremely increases because of flaws in an optical disc or dirt etc. adhering to the optical disc, information obtained for its period is not used for adjustment of the focus bias and thereby adjustment accuracy of the focus bias is prevented from reducing has been proposed.

However, in the method for stepwise changing a focus bias and sampling an RF signal and adjusting the focus bias to a voltage in which amplitude of the RF signal is maximized, the method for preventing a reduction in adjustment accuracy of the focus bias because of flaws in an optical disc or dirt etc. adhering to the optical disc has not been proposed yet. In other words, in the method for stepwise changing the focus bias and sampling the RF signal and adjusting the focus bias to the voltage in which amplitude of the RF signal is maximized, there was a problem that the adjustment accuracy of the focus bias reduces because of flaws in the optical disc or dirt etc. adhering to the optical disc.

SUMMARY OF THE INVENTION

An object of the invention is to provide an optical disc apparatus capable of adjusting a focus bias to a voltage in which amplitude of an RF signal is maximized without being influenced by flaws in an optical disc or dirt etc. adhering to the optical disc.

An optical disc apparatus of the invention includes the following configurations in order to solve the problem.

(1) According to an aspect of the present invention, an optical disc reading and reproducing apparatus includes reading means for reading data recorded on an optical disc by applying laser light to the optical disc set in a body through an objective lens and detecting its reflected light, focus control means for performing focus control for moving the objective lens in a direction of approaching to and receding from the optical disc so that a focusing position of the laser light matches with a record surface of the optical disc based on a focus error signal indicating an amount of deviation of the focusing position of the laser light from the record surface of the optical disc, focus bias adjustment means for adjusting a focus bias used in the focus control by the focus control means to a voltage in which amplitude of an RF signal acquired by the reading means is maximized, and detection means for detecting that the amplitude of the RF signal becomes smaller than a predetermined threshold level. The focus bias adjustment means while changing the focus bias stepwise by a prescribed amount between a predetermined lower limit value and a predetermined upper limit value, samples the RF signal in each of the steps and acquires amplitude of the RF signal, and from a change in the amplitude of the RF signal with respect to a change in the focus bias calculated on a basis of this, sets the focus bias to the amount in which the amplitude of the RF signal is maximized. While the detection means detects that the amplitude of the RF signal becomes smaller than the predetermined threshold level in case of changing the focus bias stepwise by the prescribed amount between the predetermined lower limit value and the predetermined upper limit value, the focus bias adjustment means stops sampling of the RF signal.

In this configuration, when the amplitude of the RF signal becomes smaller than the predetermined threshold level, that fact is detected by the detection means. The threshold level is a size capable of detecting whether or not the laser light is applied to flaws in the optical disc or dirt etc. adhering to the optical disc. When the detection means detects that the amplitude of the RF signal is smaller than the threshold level, the focus bias adjustment means stops sampling of the RF signal. Therefore, the focus bias adjustment means can adjust the focus bias without being influenced by the flaws in the optical disc or the dirt etc. adhering to the optical disc. As a result of this, data from the optical disc can also be correctly read.

(2) According to another aspect of the present invention, an optical disc reading and reproducing apparatus includes reading means for reading data recorded on an optical disc by applying laser light to the optical disc set in a body through an objective lens and detecting its reflected light, focus control means for performing focus control for moving the objective lens in a direction of approaching to and receding from the optical disc so that a focusing position of the laser light matches with a record surface of the optical disc based on a focus error signal indicating an amount of deviation of the focusing position of the laser light from the record surface of the optical disc, focus bias adjustment means for adjusting a focus bias used in the focus control by the focus control means to a voltage in which amplitude of an RF signal acquired by the reading means is maximized, and detection means for detecting that the amplitude of the RF signal becomes smaller than a predetermined threshold level. The focus bias adjustment means while changing the focus bias stepwise by a prescribed amount between a predetermined lower limit value and a predetermined upper limit value, samples the RF signal in each of the steps and acquires amplitude of the RF signal, and from a change in the amplitude of the RF signal with respect to a change in the focus bias calculated on a basis of this, sets the focus bias to the amount in which the amplitude of the RF signal is maximized. When the detection means detects that the amplitude of the RF signal becomes smaller than the predetermined threshold level in case of changing the focus bias stepwise by the prescribed amount between the predetermined lower limit value and the predetermined upper limit value, the focus bias adjustment means temporarily stops adjustment of the focus bias and after the detection means detects that the amplitude of the RF signal becomes larger than the predetermined threshold level, the adjustment of the focus bias is resumed.

In this configuration, while the detection means detects that the amplitude of the RF signal is smaller than the threshold level, the focus bias adjustment means temporarily stops adjustment of the focus bias. Then, when the detection means detects that the amplitude of the RF signal is larger than the threshold level, the focus bias adjustment means resumes the adjustment of the focus bias. Therefore, the focus bias adjustment means can adjust the focus bias without being influenced by the flaws in the optical disc or the dirt etc. adhering to the optical disc. As a result of this, data from the optical disc can also be correctly read.

(3) The focus bias adjustment means resumes the adjustment of the focus bias temporarily stopped from the size at the time when the focus bias is temporarily stopped.

In this configuration, the adjustment of the focus bias is resumed from the time when it is temporarily stopped, so that an increase in time necessary to adjust the focus bias is suppressed.

According to the invention, a focus bias can be adjusted without being influenced by flaws in an optical disc or dirt etc. adhering to the optical disc. As a result of this, data from the optical disc can also be correctly read.

DETAILED DESCRIPTION OF THE INVENTION

An optical disc apparatus which is an embodiment of the invention will be described below.

Figure 1:
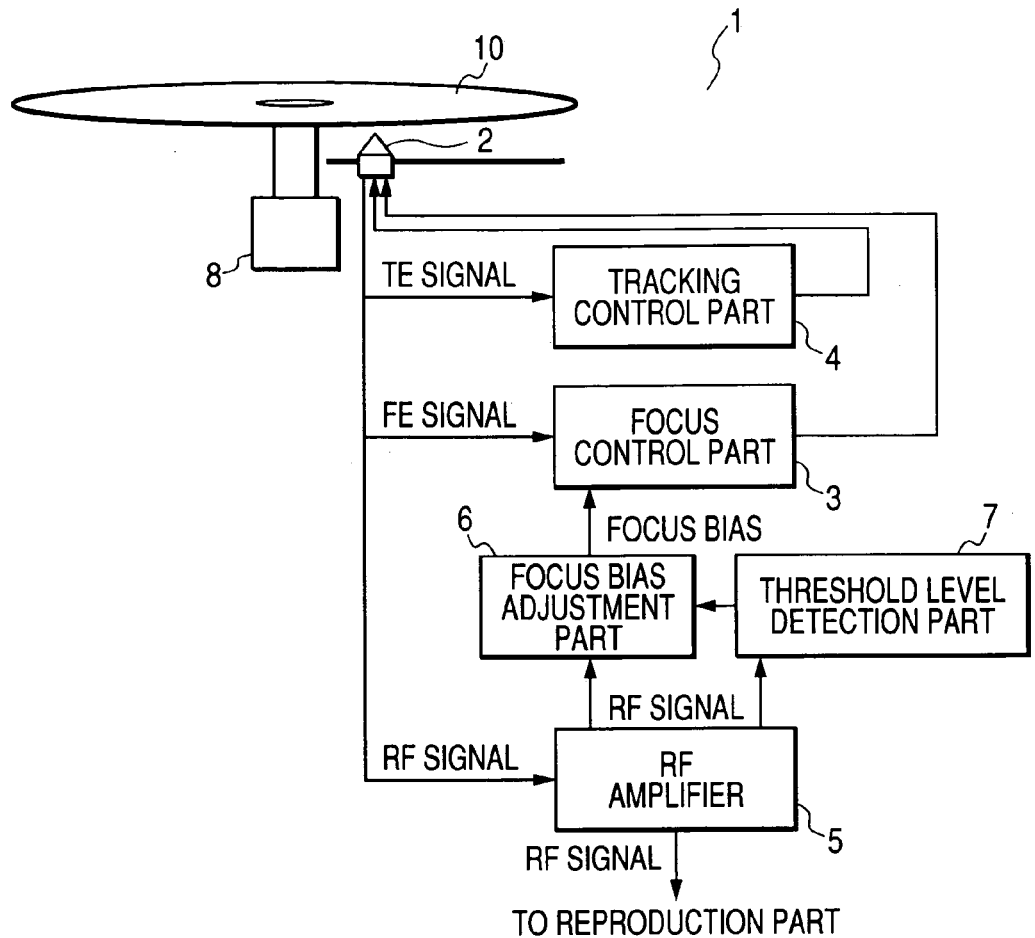
FIG. 1 is a block diagram showing a configuration of a main part of an optical disc apparatus which is an embodiment of the invention.

FIG. 1 is a block diagram showing a configuration of a main part of an optical disc apparatus which is an embodiment of the invention. The optical disc apparatus 1 which is the embodiment of the invention includes a pickup head 2 for applying laser light to an optical disc 10 set in a body, a focus control part 3 for performing focus control of focusing the laser light on a record surface of the optical disc 10, a tracking control part 4 for performing tracking control of matching the laser light with the center of a track of the optical disc 10, an RF amplifier 5 for amplifying an RF signal which is a reading signal of data recorded on the optical disc 10, a focus bias adjustment part 6 for adjusting a focus bias, a threshold level detection part 7 for determining whether or not amplitude of the RF signal amplified by the RF amplifier 5 is smaller than a predetermined threshold level and inputting its determination result to the focus bias adjustment part 6 as a detection signal, and a spindle motor 8 for rotating the optical disc 10.

The pickup head 2 is provided with an LD which is a light source, an objective lens for collecting the laser light applied from the LD, a biaxial actuator for moving this objective lens in a direction of approaching to and receding from the optical disc 10 and a radial direction of the optical disc 10, a four-division light receiving element for detecting reflected light from the optical disc 10, etc. The pickup head 2 is attached to a shaft extending in the radial direction of the optical disc 10 and is moved in the radial direction of the optical disc 10 by a sled motor (not shown) The pickup head 2 detects the reflected light from the optical disc 10 by the publicly known four-division light receiving element, and outputs a focus error signal (hereinafter called FE signal), a tracking error signal (hereinafter called TE signal) and an RF signal. As is well known, the FE signal is a signal indicating the amount of deviation of the record surface of the optical disc 10 from a focusing position of the laser light applied to the optical disc 10 and is inputted to the focus control part 3, and the TE signal is a signal indicating the amount of deviation of the center of a track of the optical disc 10 from an application position of the laser light applied to the optical disc 10 and is inputted to the tracking control part 4, and the RF signal is a reading signal of data of the optical disc 10 and is inputted to the RF amplifier 5.

The focus control part 3 generates a focus servo signal based on the FE signal inputted from the pickup head 2, and a signal in which this focus servo signal is superimposed on a focus bias is inputted to the actuator. As a result of this, the objective lens disposed in the pickup head 2 is moved in the direction of approaching to and receding from the optical disc 10, and the focusing position of the laser light applied from the LD of the pickup head 2 is matched with the record surface of the optical disc 10. The tracking control part 4 generates a tracking servo signal based on the TE signal inputted from the pickup head 2, and this tracking servo signal is inputted to the actuator. As a result of this, the objective lens disposed in the pickup head 2 is moved in the radial direction of the optical disc 10, and the application position of the laser light applied from the LD of the pickup head 2 is matched with the center of the track of the optical disc 10. Also, the tracking control part 4 drives the sled motor (not shown) and moves the pickup head 2 in the radial direction of the optical disc when the laser light applied from a light emitting element of the pickup head 2 cannot be applied to a target track by only movement of the objective lens through the actuator.

Figure 2:
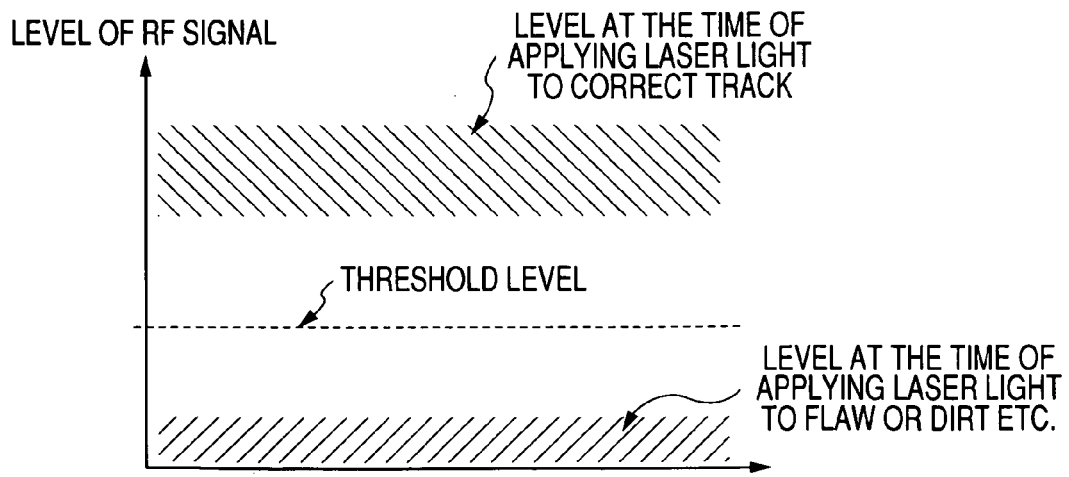
FIG. 2 is a diagram describing a size of a threshold level set in a threshold level detection part of the optical disc apparatus of this embodiment.

The RF amplifier 5 amplifies the RF signal inputted, and this signal is inputted to a reproduction part (not shown). The reproduction part decodes the RF signal inputted, and generates and outputs a reproduction signal of data read from the optical disc 10. Also, the RF amplifier 5 inputs the amplified RF signal to the focus bias adjustment part 6 and the threshold level detection part 7. The focus bias adjustment part 6 adjusts a focus bias using the RF signal inputted from the RF amplifier 5. The threshold level detection part 7 detects whether or not the laser light is applied to flaws in the optical disc 10 or dirt etc. adhering to the optical disc 10. In other words, as shown in FIG. 2, a threshold level is set at a value which is somewhat larger than a level of the RF signal obtained at the time of applying the laser light to the flaws in the optical disc 10 or the dirt etc. adhering to the optical disc 10 and is somewhat smaller than a level of the RF signal obtained at the time of applying the laser light to a correct track. As a result of this, error detection because of variations in the RF signal is prevented. The focus bias adjustment part 6 inputs a detection signal which becomes high when a level of the inputted RF signal is smaller than a threshold level and becomes low when a level of the inputted RF signal is larger than or equal to the threshold level to the focus bias adjustment part 6.

Figure 3:
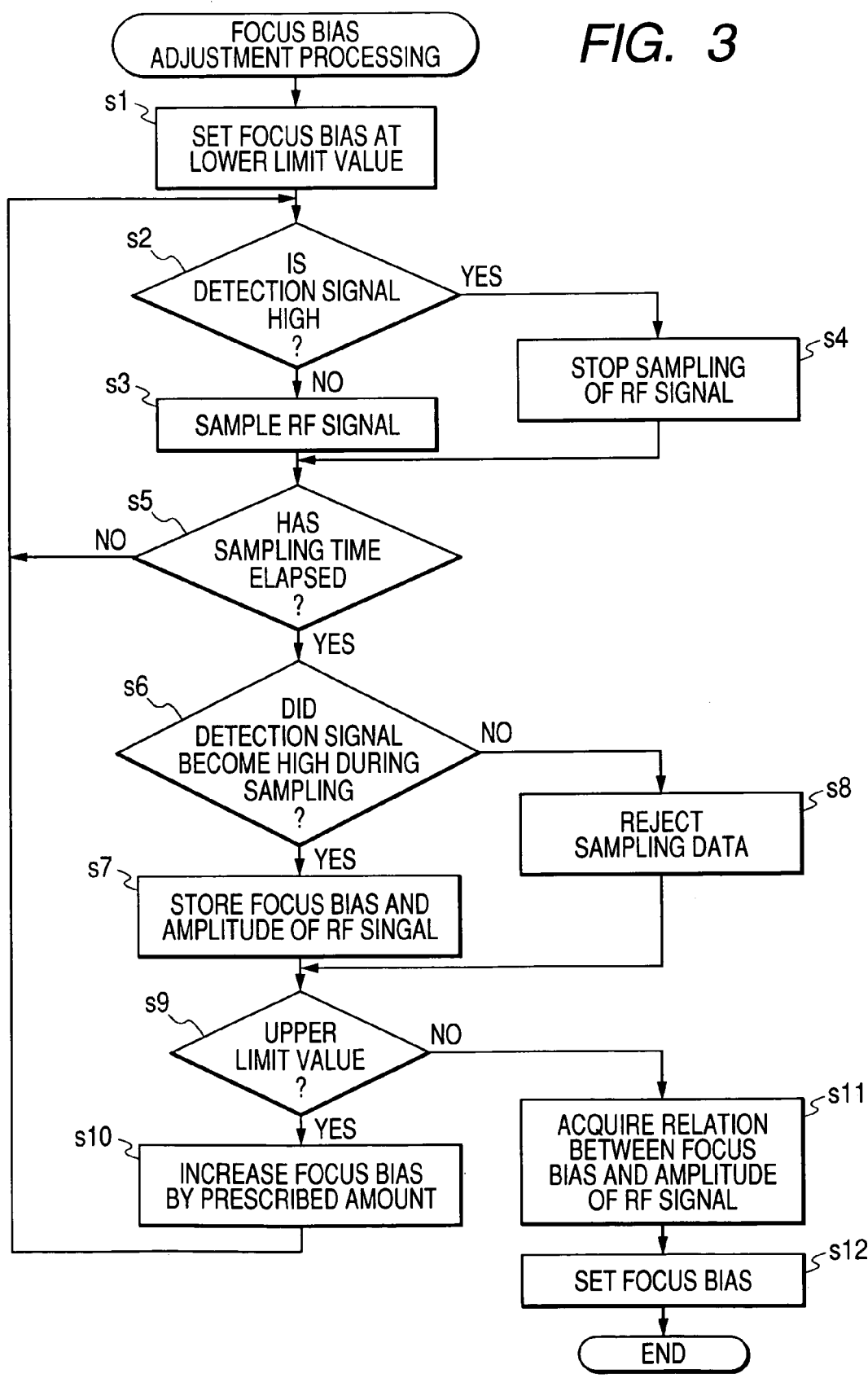
FIG. 3 is a flowchart showing focus bias adjustment processing in the optical disc apparatus of this embodiment.

Next, focus bias adjustment processing in the optical disc apparatus 1 of this embodiment will be described. This focus bias adjustment processing is performed immediately after tracking control and focus control with respect to the optical disc 10 set in the body are started. At this point in time, reading of data from the optical disc 10 is not started. FIG. 3 is a flowchart showing the focus bias adjustment processing in the optical disc apparatus of this embodiment. The focus bias adjustment part 6 sets a focus bias inputted to the focus control part 3 at a predetermined lower limit value (s1). As a result of this, a focus bias superimposed on a signal from the focus control part 3 to the actuator becomes this lower limit value. The focus adjustment part 6 determines whether or not a detection signal inputted from the threshold level detection part 7 is high (s2), and when the detection signal is low, an RF signal inputted from the RF amplifier 5 is sampled (s3). On the other hand, when the detection signal is high, the sampling of the RF signal is stopped (s4). The focus bias adjustment part 6 repeats s2 to s4 described above until it determines that sampling time of the RF signal has elapsed in s5.

The threshold level detection part 7 shifts a detection signal inputted to the focus bias adjustment part 6 to a low state when the laser light is applied to flaws in the optical disc 10 or dirt etc. adhering to the optical disc 10 and its reflected light is little detected, in other words, when the RF signal inputted from the RF amplifier 5 is smaller than a threshold level. Therefore, the focus bias adjustment part 6 does not sample the RF signal at the time of applying the laser light to the flaws in the optical disc 10 or the dirt etc. adhering to the optical disc 10 in the processing of s2 to s5 described above.

Incidentally, the sampling time is several tens ms to several hundreds ms.

In the case of determining that the sampling time has elapsed in s5, the focus bias adjustment part 6 determines whether or not there was a period during which the detection signal inputted from the threshold level detection part 7 became high within the sampling time of this time (s6). In other words, it determines whether or not sampling of the RF signal was stopped in the sampling of the RF signal of this time in s6. In the case of determining that there was no period during which the detection signal inputted became high in s6, the focus bias adjustment part 6 decides that the sampling of the RF signal of this time was performed correctly, and associates a size of a focus bias of this time with an average value of amplitudes of the RF signals sampled this time and stores them (s7). On the other hand, in the case of determining that there was the period during which the detection signal inputted became high in s6, the focus bias adjustment part 6 decides that the sampling of the RF signal of this time was not performed correctly, and rejects the RF signal sampled this time (s8).

When the processing according to s7 or s8 is completed, the focus bias adjustment part 6 determines whether or not a focus bias inputted to the focus control part 3 at this point in time is a predetermined upper limit value (s9), and when it is not the upper limit value, the focus bias inputted to the focus control part 3 is increased by a prescribed amount, for example, 10 mV (s10) and the flowchart returns to s2 and the processing described above is repeated. By repeating the processing of s2 to s10, the focus adjustment part 6 changes the focus bias inputted to the focus control part 3 stepwise by the prescribed amount from the lower limit value to the upper limit value and acquires an average value of amplitudes of the RF signals sampled in each of the steps. However, in the step in which there was the period during which the detection signal inputted from the threshold level detection part 7 became high during the sampling of the RF signal, the RF signal sampled in s8 is rejected as described above, so that an average value of amplitudes of the RF signals is not acquired.

Figure 4A:
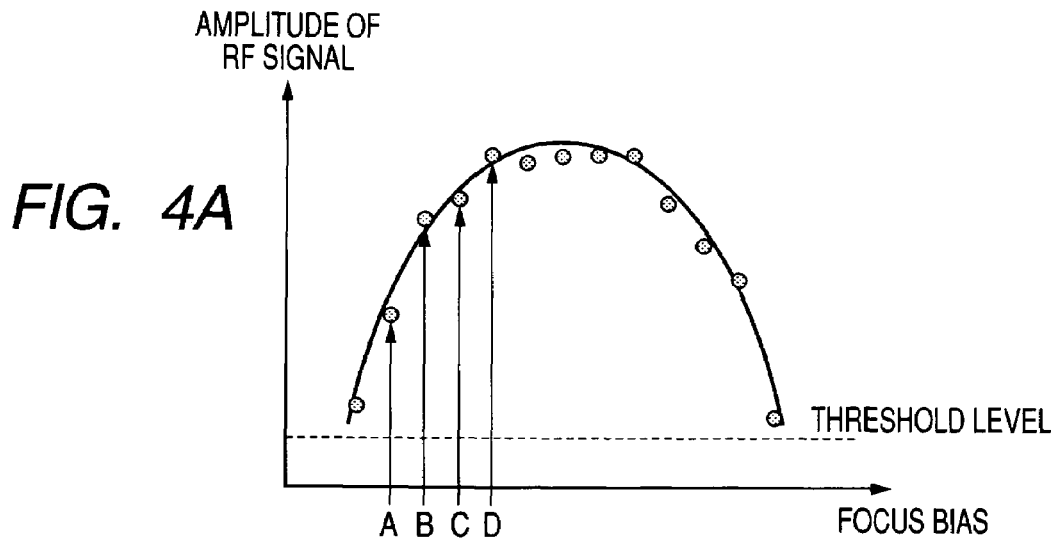
FIGS. 4A to 4C are diagrams describing a method for calculating a relation between a focus bias and amplitude of an RF signal.
Figure 4B:
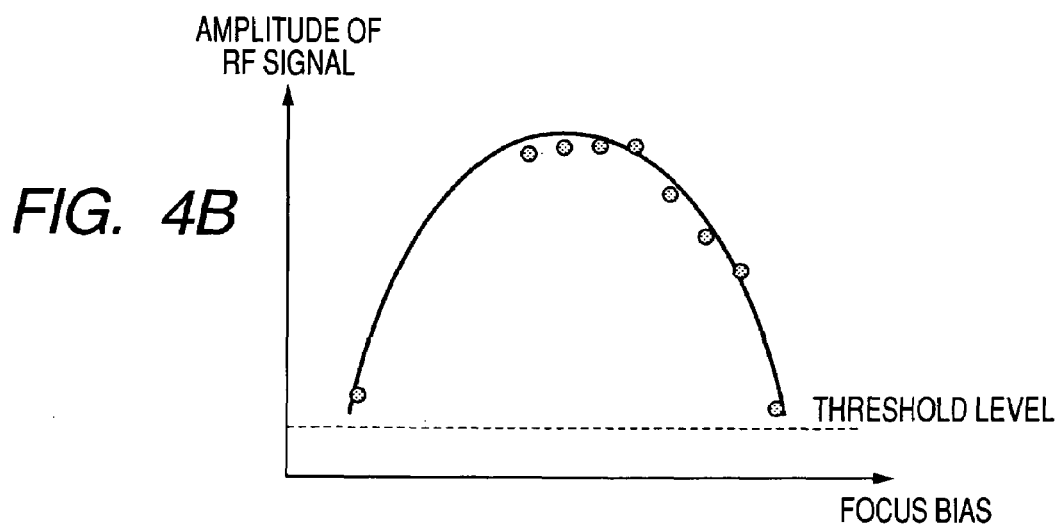
Figure 4C:
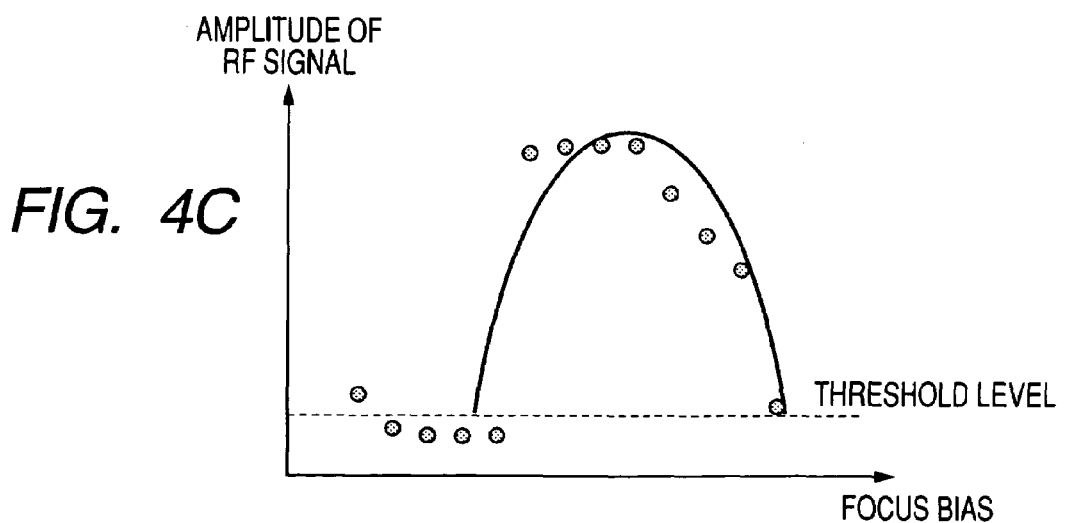

In the case of determining that the focus bias is the upper limit value in s10, the focus bias adjustment part 6 calculates a relation between the focus bias and the amplitude of the RF signal (s11). For example, as shown in FIG. 4A to 4C, quadratic approximation of a change in the amplitude of the RF signal at the time when the focus bias is changed from the lower limit value to the upper limit value by the prescribed amount is calculated in s11. FIG. 4A shows a relation between the focus bias and the amplitude of the RF signal calculated in s11 in the case that average values of amplitudes of the RF signals are acquired in all the steps of changing the focus bias stepwise by the prescribed amount from the lower limit value to the upper limit value. Also, FIG. 4B shows a relation between the focus bias and the amplitude of the RF signal calculated in s11 in the case that average values of amplitudes of the RF signals are not acquired in all the steps of changing the focus bias stepwise by the prescribed amount from the lower limit value to the upper limit value, that is, there is a period during which detection signals inputted from the threshold level detection part 7 became high (a period during which the laser light is applied to flaws in the optical disc 10 or dirt etc. adhering to the optical disc 10) during the sampling of the RF signals in four steps of A to D shown in FIG. 4A herein, in the case that there is no sampling data of the RF signals in these steps. Also, FIG. 4C shows a relation between the focus bias and the amplitude of the RF signal calculated in s11 in the case that the RF signals are also sampled in four steps of A to D shown in FIG. 4A in which there is a period during which the laser light is applied to flaws in the optical disc 10 or dirt etc. adhering to the optical disc 10 and average values of amplitudes of the RF signals acquired are used (the conventional method).

As shown in FIG. 4A to 4C, when there is the period during which the laser light is applied to flaws in the optical disc 10 or dirt etc. adhering to the optical disc 10 during sampling of the RF signals, the relation (FIG. 4B) between the focus bias and the amplitude of the RF signal calculated without using the average values of the amplitudes of the RF signals to the focus biases at this time is substantially same as the relation (FIG. 4A) between the focus bias and the amplitude of the RF signal calculated in the case that the average values of the amplitudes of the RF signals are acquired in all the steps of changing the focus bias stepwise by the prescribed amount from the lower limit value to the upper limit value. On the other hand, even when there is the period during which the laser light is applied to flaws in the optical disc 10 or dirt etc. adhering to the optical disc 10 during sampling of the RF signals, the relation (FIG. 4C) between the focus bias and the amplitude of the RF signal calculated using the average values of the amplitudes of the RF signals to the focus biases acquired at this time is greatly different from the relation (FIG. 4A) between the focus bias and the amplitude of the RF signal calculated in the case that the average values of the amplitudes of the RF signals are acquired in all the steps of changing the focus bias stepwise by the prescribed amount from the lower limit value to the upper limit value.

From the relation between the focus bias and the amplitude of the RF signal calculated in s11, the focus adjustment part 6 detects a size of the focus bias in which the amplitude of the RF signal is maximized, and sets this size to the focus bias inputted to the focus control part 3 (s12), and the present processing is ended.

Thus, when there is the period during which the laser light is applied to flaws in the optical disc 10 or dirt etc. adhering to the optical disc 10 during sampling of the RF signals, the optical disc apparatus 1 of this embodiment adjusts a focus bias without using the average values of the amplitudes of the RF signals to the focus biases at this time, so that a reduction in adjustment accuracy of the focus bias because of the flaws in the optical disc 10 or the dirt etc. adhering to the optical disc 10 can be prevented and data can be correctly read from the optical disc 10.

Next, another embodiment of the invention will be described. An optical disc apparatus 1 of this embodiment also has a configuration shown in FIG. 1 in a manner similar to the apparatus of the embodiment described above. The optical disc apparatus 1 differs in the following focus bias adjustment processing.

Figure 5:
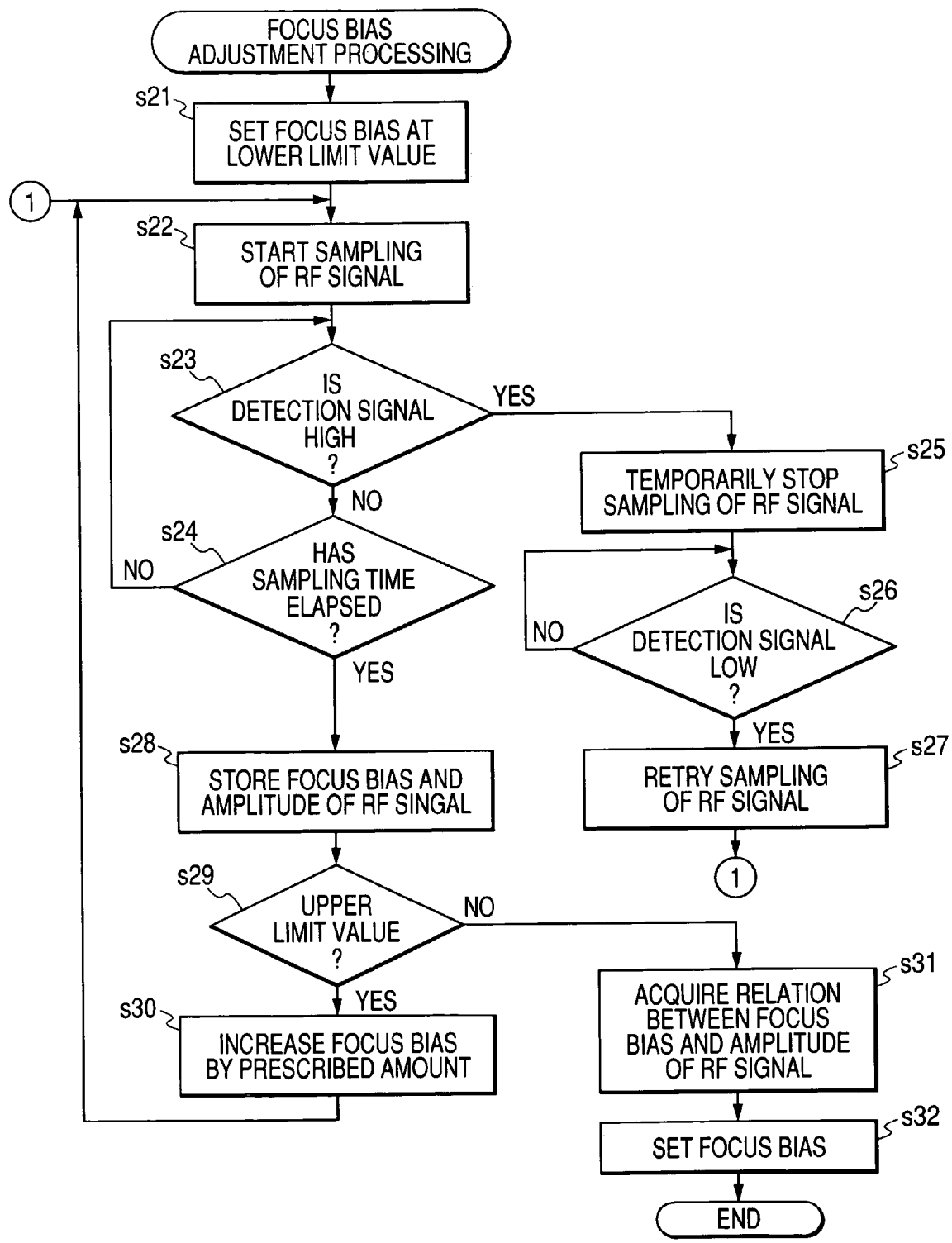
FIG. 5 is a flowchart showing focus bias adjustment processing in an optical disc apparatus of another embodiment.

FIG. 5 is a flowchart showing focus bias adjustment processing in the optical disc apparatus according to another embodiment. In a manner similar to the apparatus of the embodiment described above, this focus bias adjustment processing is performed immediately after tracking control and focus control with respect to an optical disc 10 set in a body are started. At this point in time, reading of data from the optical disc 10 is not started. A focus bias adjustment part 6 sets a focus bias inputted to a focus control part 3 at a predetermined lower limit value (s21). As a result of this, a focus bias superimposed on a signal from the focus control part 3 to an actuator becomes this lower limit value. The focus adjustment part 6 starts sampling of an RF signal (s22), and monitors whether or not a detection signal inputted from a threshold level detection part 7 is maintained low until sampling time has elapsed (s23, s24).

When the detection signal inputted from the threshold level detection part 7 becomes high, the focus bias adjustment part 6 temporarily stops the sampling of the RF signal (s25), and waits for this detection signal to return to a low state (s26). In the case of detecting that the detection signal inputted returns to the low state in s26, the focus bias adjustment part 6 starts a retry of sampling of the RF signal (s27), and the flowchart returns to s23.

When the detection signal inputted from the threshold level detection part 7 is maintained low until the sampling time has elapsed since sampling of the RF signal was started, the focus adjustment part 6 associates a size of a focus bias of this time with an average value of amplitudes of the RF signals sampled this time and stores them (s28). When the processing according to s28 is completed, the focus bias adjustment part 6 determines whether or not a focus bias inputted to the focus control part 3 at this point in time is a predetermined upper limit value (s29), and when it is not the upper limit value, the focus bias inputted to the focus control part 3 is increased by a prescribed amount, for example, 10 mV (s30) and the flowchart returns to s22 and the processing described above is repeated. By repeating the processing of s22 to s30, the focus adjustment part 6 changes the focus bias inputted to the focus control part 3 stepwise by the prescribed amount from the lower limit value to the upper limit value and acquires an average value of amplitudes of the RF signals sampled in each of the steps. Also, in the step in which there was a period during which the detection signal inputted from the threshold level detection part 7 became high during the sampling of the RF signal, the sampling of the RF signal is retried as described above, so that average values of amplitudes of the RF signals are acquired in all the steps of changing the focus bias stepwise by the prescribed amount from the lower limit value to the upper limit value.

In the case of determining that the focus bias is the upper limit value in s29, the focus adjustment part 6 calculates a relation between the focus bias and the amplitude of the RF signal (s31). As described above, quadratic approximation of a change in the amplitude of the RF signal at the time when the focus bias is changed from the lower limit value to the upper limit value by the prescribed amount is calculated in s31. From the relation between the focus bias and the amplitude of the RF signal calculated in s31, the focus adjustment part 6 detects a size of the focus bias in which the amplitude of the RF signal is maximized, and sets this size to the focus bias inputted to the focus control part 3 (s32), and the present processing is ended.

Thus, in the step in which there was the period during which the detection signal inputted from the threshold level detection part 7 became high during the sampling of the RF signal, the optical disc apparatus 1 of this embodiment retries the sampling of the RF signal, so that average values of amplitudes of the RF signals are acquired in all the steps of changing the focus bias stepwise by the prescribed amount from the lower limit value to the upper limit value. Therefore, a reduction in adjustment accuracy of the focus bias because of the flaws in the optical disc 10 or the dirt etc. adhering to the optical disc 10 can be prevented and data can be correctly read from the optical disc 10. Also, when the detection signal inputted from the threshold level detection part 7 became high during the sampling of the RF signal, processing according to adjustment of the focus bias is not retried from the beginning and it is configured to retry sampling of the RF signal with respect to the size of the focus bias at that time, so that an increase in time necessary to adjust the focus bias is also suppressed.

What is claimed is:

1. An optical disc reading and reproducing apparatus comprising:

reading means for reading data recorded on an optical disc by applying laser light to the optical disc set in a body through an objective lens and detecting its reflected light;

focus control means for performing focus control for moving the objective lens in a direction of approaching to and receding from the optical disc so that a focusing position of the laser light matches with a record surface of the optical disc based on a focus error signal indicating an amount of deviation of the focusing position of the laser light from the record surface of the optical disc;

focus bias adjustment means for adjusting a focus bias used in the focus control by the focus control means to a voltage in which amplitude of an RF signal acquired by the reading means is maximized; and detection means for detecting that the amplitude of the RF signal becomes smaller than a predetermined threshold level, wherein the focus bias adjustment means while changing the focus bias stepwise by a prescribed amount between a predetermined lower limit value and a predetermined upper limit value, samples the RF signal in each of the steps and acquires amplitude of the RF signal, and from a change in the amplitude of the RF signal with respect to a change in the focus bias calculated on a basis of this, sets the focus bias to the amount in which the amplitude of the RF signal is maximized, and when the detection means detects that the amplitude of the RF signal becomes smaller than the predetermined threshold level in case of changing the focus bias stepwise by the prescribed amount between the predetermined lower limit value and the predetermined upper limit value, the focus bias adjustment means temporarily stops adjustment of the focus bias and after the detection means detects that the amplitude of the RF signal becomes larger than the predetermined threshold level, the adjustment of the focus bias is resumed from a size at the time when the focus bias is temporarily stopped.

2. An optical disc reading and reproducing apparatus comprising:

reading means for reading data recorded on an optical disc by applying laser light to the optical disc set in a body through an objective lens and detecting its reflected light;

focus control means for performing focus control for moving the objective lens in a direction of approaching to and receding from the optical disc so that a focusing position of the laser light matches with a record surface of the optical disc based on a focus error signal indicating an amount of deviation of the focusing position of the laser light from the record surface of the optical disc;

focus bias adjustment means for adjusting a focus bias used in the focus control by the focus control means to a voltage in which amplitude of an RF signal acquired by the reading means is maximized; and detection means for detecting that the amplitude of the RF signal becomes smaller than a predetermined threshold level, wherein the focus bias adjustment means while changing the focus bias stepwise by a prescribed amount between a predetermined lower limit value and a predetermined upper limit value, samples the RF signal in each of the steps and acquires amplitude of the RF signal, and from a change in the amplitude of the RF signal with respect to a change in the focus bias calculated on a basis of this, sets the focus bias to the amount in which the amplitude of the RF signal is maximized, and when the detection means detects that the amplitude of the RF signal becomes smaller than the predetermined threshold level in case of changing the focus bias stepwise by the prescribed amount between the predetermined lower limit value and the predetermined upper limit value, the focus bias adjustment means stops sampling of the RF signal.

3. An optical disc reading and reproducing apparatus comprising:

reading means for reading data recorded on an optical disc by applying laser light to the optical disc set in a body through an objective lens and detecting its reflected light;

focus control means for performing focus control for moving the objective lens in a direction of approaching to and receding from the optical disc so that a focusing position of the laser light matches with a record surface of the optical disc based on a focus error signal indicating an amount of deviation of the focusing position of the laser light from the record surface of the optical disc;

focus bias adjustment means for adjusting a focus bias used in the focus control by the focus control means to a voltage in which amplitude of an RF signal acquired by the reading means is maximized; and detection means for detecting that the amplitude of the RF signal becomes smaller than a predetermined threshold level, wherein the focus bias adjustment means while changing the focus bias stepwise by a prescribed amount between a predetermined lower limit value and a predetermined upper limit value, samples the RF signal in each of the steps and acquires amplitude of the RF signal, and from a change in the amplitude of the RF signal with respect to a change in the focus bias calculated on a basis of this, sets the focus bias to the amount in which the amplitude of the RF signal is maximized, and when the detection means detects that the amplitude of the RF signal becomes smaller than the predetermined threshold level in case of changing the focus bias stepwise by the prescribed amount between the predetermined lower limit value and the predetermined upper limit value, the focus bias adjustment means temporarily stops adjustment of the focus bias and after the detection means detects that the amplitude of the RF signal becomes larger than the predetermined threshold level, the adjustment of the focus bias is resumed.

4. The optical disc reading and reproducing apparatus as claimed in claim 3, wherein the focus bias adjustment means resumes the adjustment of the focus bias temporarily stopped from the size at the time when the adjustment of the focus bias is temporarily stopped.

5. An optical disc reading and reproducing method comprising:

reading data recorded on an optical disc by applying laser light to the optical disc set in a body through an objective lens and detecting its reflected light;

performing focus control for moving the objective lens in a direction of approaching to and receding from the optical disc so that a focusing position of the laser light matches with a record surface of the optical disc based on a focus error signal indicating an amount of deviation of the focusing position of the laser light from the record surface of the optical disc;

adjusting a focus bias used in the focus control to a voltage in which amplitude of an acquired RF signal is maximized;

detecting that the amplitude of the RF signal becomes smaller than a predetermined threshold level;

while changing the focus bias stepwise by a prescribed amount between a predetermined lower limit value and a predetermined upper limit value, sampling the RF signal in each of the steps and acquiring amplitude of the RF signal, and from a change in the amplitude of the RF signal with respect to a change in the focus bias calculated on a basis of this, setting the focus bias to the amount in which the amplitude of the RF signal is maximized; and when detecting that the amplitude of the RF signal becomes smaller than the predetermined threshold level in case of changing the focus bias stepwise by the prescribed amount between the predetermined lower limit value and the predetermined upper limit value, temporarily stopping adjustment of the focus bias and after detecting that the amplitude of the RF signal becomes larger than the predetermined threshold level, resuming the adjustment of the focus bias from a size at the time when the focus bias is temporarily stopped.

* * * * *